United States Patent [19]

Jamzadeh

[11] Patent Number: 4,893,135
[45] Date of Patent: Jan. 9, 1990

[54] LASER PRINTER WITH POSITION REGISTRATION ENHANCEMENT

[75] Inventor: Fereidoon S. Jamzadeh, Fairport, N.Y.

[73] Assignee: Eastman Kodak Company, Rochester, N.Y.

[21] Appl. No.: 248,075

[22] Filed: Sep. 23, 1988

[51] Int. Cl.⁴ .......... G01D 15/14; G01D 9/00; H04N 1/21

[52] U.S. Cl. .......... 346/108; 346/1.1; 358/296

[58] Field of Search .......... 346/108, 107 R, 76 L, 346/160, 1.1; 358/296, 300, 302

[56] References Cited

U.S. PATENT DOCUMENTS

| | | | |
|---|---|---|---|
| 4,538,905 | 9/1985 | Griego et al. | 355/14 SH |
| 4,591,880 | 5/1986 | Mitsuka | 346/108 |
| 4,660,077 | 4/1987 | Kawamura et al. | 358/75 |
| 4,695,849 | 9/1987 | Dei | 346/180 |
| 4,712,118 | 12/1987 | Seto et al. | 346/108 |
| 4,745,490 | 5/1988 | Shimizu | 346/160 |

Primary Examiner—Bruce A. Reynolds
Assistant Examiner—Mark Reinhart
Attorney, Agent, or Firm—J. R. Hanway

[57] ABSTRACT

Endless web laser printer having enhanced copy registration. Compensation is made for the position of the laser beam along the scan line when the image scanning is to begin. The extra delay in starting the image scan is translated to an equal and extra delay for feeding the paper to the image transfer station. Up to one full line of misregistration can be corrected. Dividing the scan line into segments decreases the possible number of extra delay time quantities consistent with the perceivable improvement in registration tolerance.

15 Claims, 3 Drawing Sheets

LASER PRINTER WITH POSITION REGISTRATION ENHANCEMENT

BACKGROUND OF THE INVENTION

1. Field of the Invention

This invention relates, in general, to laser printers and, more specifically, to registration enhancing systems for hard copy scanning printers, including laser printers.

2. Description of the Prior Art

In some applications, the location of the printed image upon the hard copy or sheet material on which the printed image is produced is not critical to acceptable operation of the printer. Generally speaking, precise printers, such as laser printers, which are used to produce a single copy of an image, perform satisfactorily if the image is registered on the hard copy paper within a fraction of an inch of the true registration position. However, with more and more printers using images stored in digital memory to construct the image on the hard copy material, more precise control of the location of the image is possible than with optical type duplicators and copiers.

Registration is particularly important when the printer is being used in some fashion for color printing or reproduction. In many color printing systems, several colors are printed separately on top of each other to form a composite color image. In order to have a good quality color image, it is necessary that the individual colors be aligned or registered very accurately on the printed paper. Color registration which is off just a very small fraction of an inch will produce color images that are not acceptable to present standards. Precise registration is also desired for machines which make masters to be used in color printing operations. With the resolution of such machines being greater, in some cases, than 1,000 lines per inch, the opportunity exists for producing very sharp composite color images if the registration between the different color masters is properly maintained.

Lack of registration in laser printers occurs for a variety of reasons. One of the reasons involves the synchronization of the laser scanning beam with the surface onto which the beam is focused. One type of currently available laser printer uses a photoconductive web material constructed in an endless belt configuration which rotates around rollers to move the latent image created by the laser beam through the other stations of the printer to eventually produce the hard copy output. With this type of printing system, the scanning of the laser beam must be coordinated with the speed and position of the web and with the electronic control of the modulation, or illumination control, of the laser beam. Typically, such systems include a means for scanning the laser beam linearly across the web surface to form one line of the image at a time. Successive line scans are used to construct an entire image on the web. Normally, the web is moving to provide a displacement from line to line, and the laser beam moves from one end of the line to the other end of the line.

Many printers operate with the location of the web and the location of the laser beam on the scan line not always synchronized to each other. In other words, when the web is in a position to receive the image to be constructed by the laser beam, the laser beam may be already oriented to scan somewhere within the line. Since the scan is always started at the beginning of the line, a delay is necessary before the scan is commenced. The amount of delay depends upon the position of the laser beam within the line when the image is to be started. Starting of the image does not occur until the laser beam returns to the edge of the web and trips or is detected by a photodetector which signifies that the laser beam is in a position to start accepting image information which will be written or imaged onto the photoconductive web. As a result, it is possible, in a worst case analysis, that the laser beam would just have passed the edge detector when it is to start writing an image on the web. Since the image does not start writing until the laser beam scans the entire line and starts again at the edge, significant misregistration on the web can occur. In this case, the image written onto the web can be misregistered by an amount equal to the width of one scan line. When the printer is used to make masters for multicolor printing processes and to make color prints, this type of misalignment in the registration between the various color masters or the print layers produces undesirable copies, or prints.

Therefore, it is desirable, and it is an object of this invention, to provide a laser printer which produces hard copy images which are registered at an exact location more accurately than with laser printers constructed according to the prior art.

SUMMARY OF THE INVENTION

There is disclosed herein a new and useful apparatus and method to enhance the registration in laser printers using endless web-type or drum photoconductive surfaces. The enhancement is provided by delaying the feeding of paper into the image transfer station by an amount of time the latent image was delayed in scanning at the exposing station due to the position of the laser beam when scanning was to begin. A start of page (SOP) signal is provided by the location of the web and indicates that the web is in a position to accept laser scanned images thereon. Circuitry is included to determine the time difference between the receipt of the start of page signal and the receipt of a start of line (SOL) signal which is activated by the laser beam when it returns to the edge of the web to begin starting the scan of a new line. This delay can be as much as one full line if the laser beam had just started scanning a line at the time the start of page signal was issued. The delays between the two signals are converted to counts which are then converted to time delays and are used to extend or delay the conventional signal issued by the master system controller to feed paper into the transfer region.

Another embodiment of the invention uses segmented scan lines to determine how much delay will be added to the paper feed timing signal. With the segmented system, a smaller number of delay periods are used, thereby delaying the paper feed by an amount equal to the delay contained within one of the segments. This embodiment reduces the number of delay times and accounts for and takes into consideration the other inaccuracies of the printer in registering precisely hard copy outputs therefrom. The enhancement system disclosed herein is straight forward, economical, and easy to implement using conventional apparatus while still providing a very worthwhile and meaningful improvement in the registration of direct color prints and of printed copies, especially when high resolution multiple masters used in color separation printing are employed.

BRIEF DESCRIPTION OF THE DRAWINGS

Further advantages and uses of this invention will become more apparent when considered in view of the following detailed description and drawings, in which.

DESCRIPTION OF THE PREFERRED EMBODIMENTS

Figure 1:
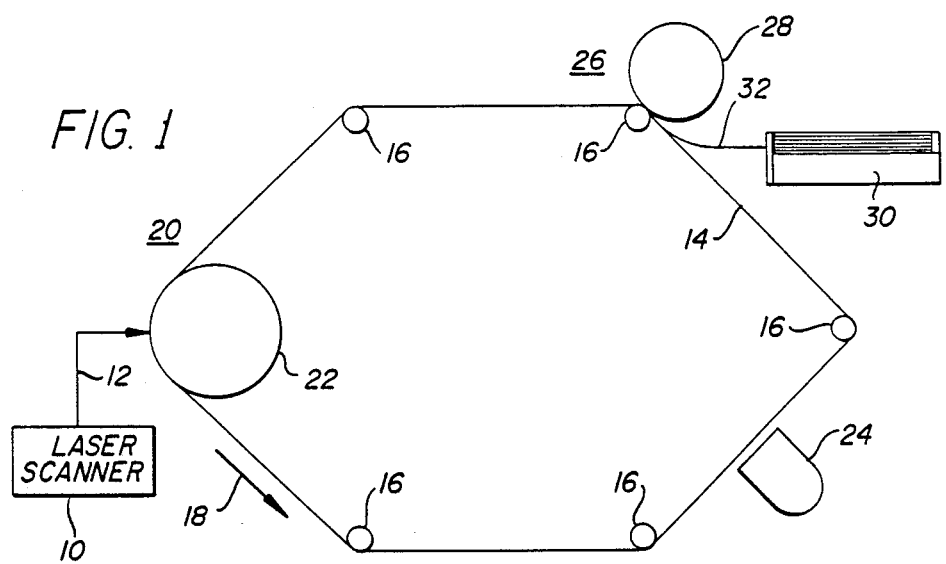
FIG. 1 is a schematic view illustrating the operation of a web-type laser printer.

Throughout the following description, similar reference characters refer to similar elements or members in all of the figures of the drawing.

Referring now to the drawings, and to FIG. 1 in particular, there is shown a laser printer constructed according to this invention. The printer includes the laser scanner 10 which emits a laser beam 12. Normal, non-laser light sources can also be used. A photoconductive surface or web 14 is constructed in an endless loop and disposed around rollers, such as rollers 16, and is rotated in the direction indicated by arrow 18. The exposing or image station 20 includes the roller 22 and other required apparatus not specifically illustrated in FIG. 1. During the operation of the printer, the web 14 travels across roller 22 and is exposed, line by line, by the laser beam 12 which is controlled by suitable electronics to construct the desired image on the web 14. This latent image moves, with the movement of the web 14, through other stations of the printer, including the development station 24 where the toner is applied to the web 14, and the transfer station 26. At the transfer station 26, the developed image on the web 14 is transferred, with the aid of the transfer roller 28, to a sheet of paper or other suitable hard copy material. The paper is fed from the paper feeder 30 and travels along the paper guide 32 to engage between the rollers 16 and 28 for transfer of the image on the web 14. Timing of the paper feed is such that the paper is synchronized or positioned directly over the imager frame contained on the web 14. However, for the reasons indicated in the background of the prior art and without the teachings of this invention, the feeding of the paper sheets can be displaced in time enough that the registration of the image on the sheet is not exactly correct. This is due to the position of the laser beam along the line when the web 14 is at the correct position to receive a page or frame of scanned information.

Figure 2:
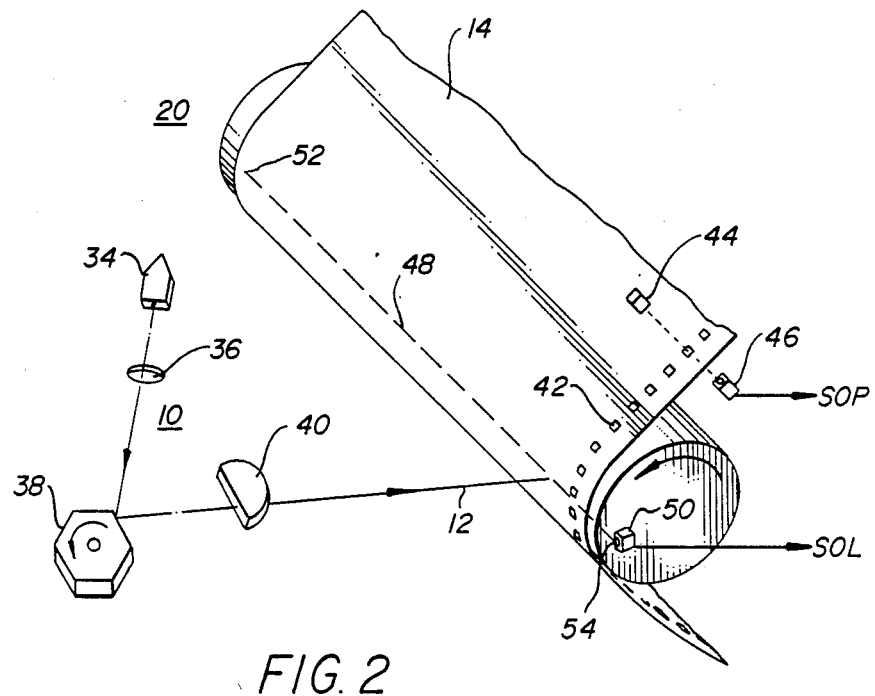
FIG. 2 is a schematic view of the scanning and exposing portion of the printer shown in FIG. 1.

FIG. 2 is a view illustrating the exposure station 20 in more detail. The laser system includes the laser 34, the lens 36, the rotating mirror 38, and the lens 40. Actual operating exposure stations may contain more and different types of lenses for a particular application, but the arrangement shown in FIG. 2 is illustrative of the invention and is simplified in the interest of clarity. It is emphasized that the beam of light produced by the laser 34 would be modulated in the manner necessary to provide the information on the scanned line. The modulation of the laser 34 is performed and controlled by associated electrical circuitry not shown in FIG. 2. Although the modulation may be in the form of being either completely on or off by applying low and high voltages to the laser diode, other forms of modulation may be used. It is also within the contemplation of the invention that the laser beam could be modulated in an analog fashion for the purpose of creating different levels of intensity impinging upon the photoconductive web 14 by using a suitable modulator, such as an acousto-optic cell.

According to FIG. 2, the web 14 contains perforations 42 along an edge of the web which are used to determine and measure the location of the web as it rotates around the rollers of the printer. The light emitter 44 and the light detector 46 provide a means for determining the location of the web 14 using the perforations 42. The actual location may be a translation from the number of light detections, pulses, or "tick" marks generated by the emitter 44 and detector 46. By keeping an account of the number of pulses detected by the light detector 46, the exact location of the web anywhere around the path of travel can be determined by the electronic circuitry. Thus, when the area of the web 14 in which an image is to be written is at a position where the image would be started, the light detector 46 effectively tells the electronics of the image area position. For example, when an image area is adjacent to the scan line 48, the start of page (SOP) signal is, in effect, generated by the light emitter 44, light detector 46, and the associated electronic counting circuitry.

The SOP signal indicates that the photoconductive web 14 is physically in position to receive scanned information from the laser scanner 10 to construct the latent image on the web 14. After the SOP signal is received, the control circuitry is ready to start feeding data to the laser 34 for the purpose of modulating the laser beam 12 as it scans the scan line 48. However, modulation of the laser beam does not start until the exact location of the laser beam is determined. This is determined by the detection of the laser beam by the light detector 50 which signifies that the laser beam has returned substantially to the edge of the web 14 and is starting another transition across the web along scan line 48. When such a detection or start of line (SOL) signal is received, the electronic control circuitry knows to start the modulation on the laser beam.

Since the position of the laser beam is not synchronized with the position of the web 14, it is highly possible that, when the SOP signal is issued, the laser beam may be anywhere along the scan line 48. Note that although the laser beam 12 may be oriented anywhere along the scan line 48 at that particular moment because of the rotation of the mirror 38, the laser beam 12 may be in the off state due to the modulating ability of the laser 34. This prevents exposure of the web before a new line is started. In the worst case, the laser beam 12 may be just past the light detector 50 when the SOP signal is issued, thereby requiring that the laser beam travel to the end 52 of the scan line until the mirror moves the beam 12 to the beginning position 54 of the scan line 48.

Figures 3, 4, 5:
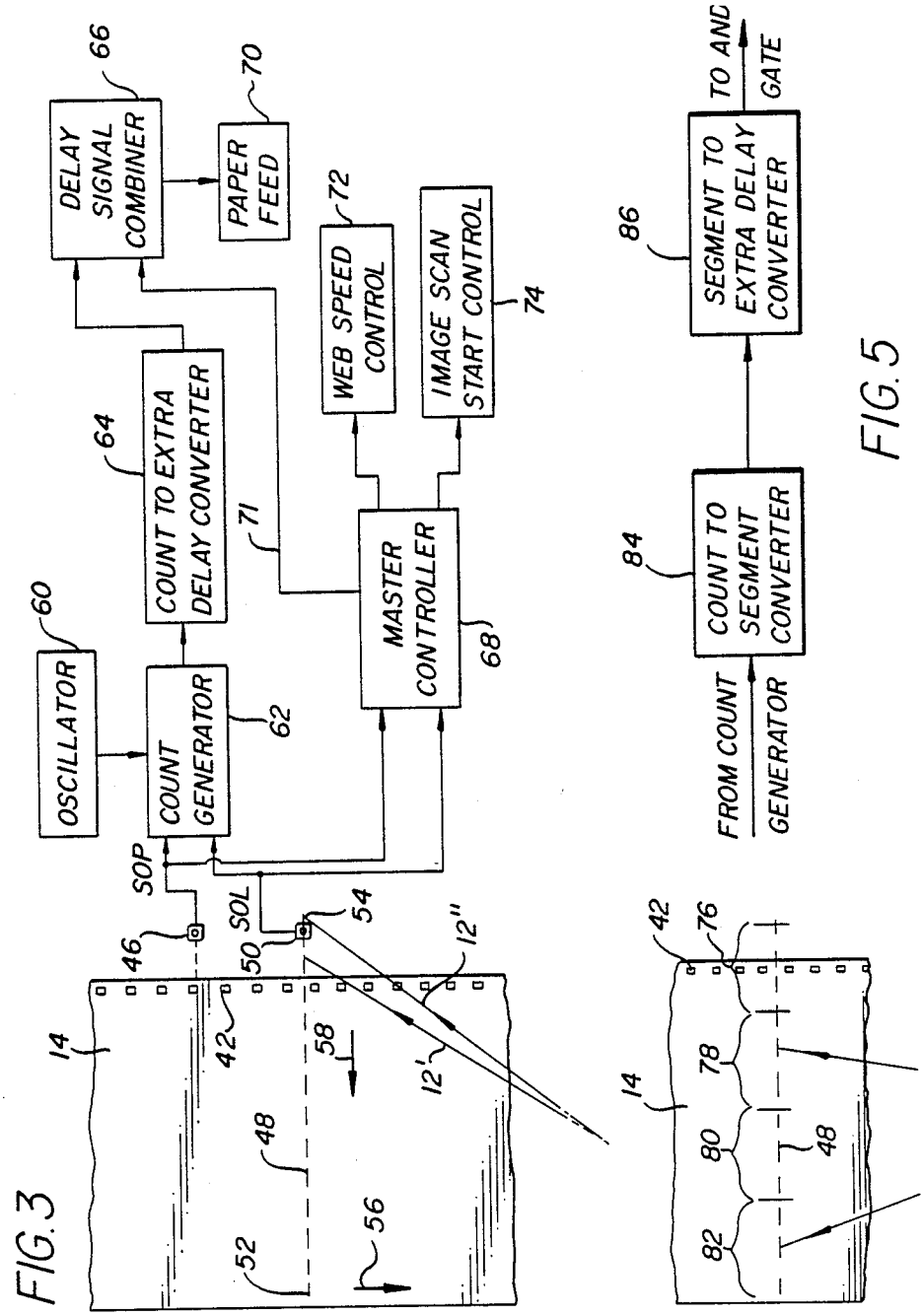
FIG. 3 is a block diagram illustrating a circuit arrangement for implementing the invention.
FIG. 4 is a partial view of the photoconductive web illustrating the segmenting feature of the invention.
FIG. 5 is a partial block diagram illustrating changes in FIG. 3 for segmented operation.

FIG. 3 shows a system for compensating for the position of the scan line when the SOP signal is issued. Very briefly, the system of FIG. 3 delays the feeding of the paper from the paper feeder 30, as shown in FIG. 1, by a time interval equal to the time required for the laser beam to be detected by the light detector 50 after the SOP signal has been issued. In other words, the amount of delay which is necessary at the exposing station because of the need to wait for the laser beam to return to the edge of the web 14 is added to the normal time the paper is fed from the paper feeder 30. Thus, when the delays are equal, the registration is unaffected by the delay, up to one scan line, of the time at which the page starts scanning the latent image upon the web 14. It is emphasized that the photoconductive surface does not have to be in the form of a web to use the invention. A drum or roller of photoconductive material which moves past the scanning line and has a sheet fed later to receive the developed image could also use the teachings of this invention.

According to FIG. 3, the web 14 moves in direction 56 and the laser beam moves in direction 58 along scan line 48. Assuming that the laser beam 12' is at the indicated position when the SOP signal is issued, the SOL signal will not issue until the beam 12' scans the line 48 completely and returns to scan the line again beginning at the position of laser beam 12" where it trips the detector 50 and issues the SOL signal. The difference between the two signals is indicated and calculated by the oscillator circuit 60 and the count generator 62, although other electrical circuits may be used to generate the same output characteristics. The count generator 62 counts the number of oscillator pulses from oscillator 60 after the SOP signal has been received and before the SOL signal is received. Logic gates within the generator 62 activate, deactivate and reset the counters therein during the time interval between the receipt of the two start signals, namely the SOP and the SOL signals.

The output of the count generator 62 is applied to the count to extra delay converter 64 which changes the amount of the counts into a time delay signal. This time delay is applied to the delay signal combiner 66 along with another timing signal from the master oscillator 68. It is pointed out that the paper feed 70 is controlled by a normal timing signal 71 from a master controller which takes into consideration the length of the web and the speed of the web on which the latent image exists. It is the extra delay furnished by the circuit contained in block 64 that is added, by the combiner 66, to the normal signal issued by the master controller 68 which is ultimately applied to the paper feed 70. If there was no extra delay required because the laser beam was at position 12" at the exact time the SOP signal issued, then there would be no extra delay provided by this circuitry to the paper feed 70. However, more likely than not, a certain amount of delay will be added to each paper feeding signal from the master controller 68 because of the position of the laser beam within the area of the scan line when the SOP signal issues, with the maximum delay equal to the time equivalent width of one scan line. The master controller 68 also controls the web speed control 72 and the image scan start control 74 which must be accurately controlled to maintain the desired registration.

The circuitry of FIG. 3 provides a large, near infinite, number of different time delays depending upon the position of the laser beam. Because of other factors in the laser printer which affect the registration of the resulting hard copy, it may not be desirable to control the paper feeder over such a discrete and fine range. In this respect, the segmented embodiment shown in FIG. 4 may be used where the degree of correction of misregistration is sufficient if the scan line is segmented and the location of the laser beam within a segment is determined.

According to FIG. 4, the scan line 48 is divided into segments 76, 78, 80 and 82. Other numbers of segments are within the contemplation of the invention. With a four-segment system, the delays issued to the paper feeder 30, as shown in FIG. 3, will be limited to four discrete values. Depending at which of the four segments the laser beam is located when the SOP signal issues, the delay for the paper feeder is adjusted accordingly. Anywhere within the same segment, the laser beam will cause the same amount of delay. This effectively reduces the possible number of delay time intervals and brings the correction factor within the practical limits of the machine. For example, if the laser beam was initially at the segment 78, the extra delay applied to the paper feeder would be equal to the time required to scan three-fourths of a scan line, as represented by segments 78, 80 and 82. On the other hand, if the laser beam was located in segment 82 at the beginning of the SOP signal, the extra delay would be equal to one-fourth the time required to scan an entire scan line 48. Coarser or finer increments for the segments can be used, and different delays can be assigned to the segments without departing from the invention.

FIG. 5 illustrates a partial block diagram which can be used to alter the block diagram in FIG. 3 to implement the segmented operation shown in FIG. 4. According to FIG. 5, the count to segment converter 84 and the segment to extra delay converter 86 would replace the count to extra delay converter 64 shown in FIG. 3. Therefore, according to FIG. 5, the counts from the generator 62 would first be converted to the segments within the scan line, and once the segment is determined, the segment is transferred to block 86 where the extra delay is calculated dependent upon the segment number. It is pointed out that the location determination of the laser beam along the scan line with either segmented or nonsegmented operation is actually made by the electronic counts received prior to the activation of the SOL detector or signal. This provides information about the point at which the laser beam is located from the end 54 of the scan line. Since the number of counts is known for a complete scan line, a count number smaller than the maximum count number provides information as to the location of the laser beam along the scan line when the start of page or SOP signal issues.

Figure 6:
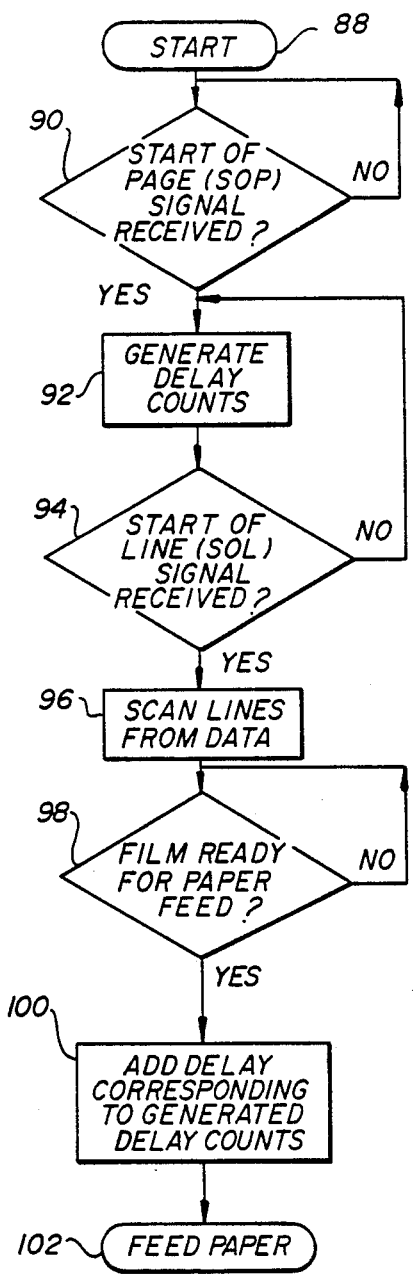
FIG. 6 is a flow chart illustrating a method of implementing the invention using microprocessor control.

FIG. 6 is a flow chart illustrating the steps performed by a microprocessor system which may be used to implement the enhanced registration features of this invention rather than using dedicated logic circuitry. According to FIG. 6 and after the start 88 is implemented, the processor looks for a start of the SOP signal, as indicated by block 90. Until the SOP signal is received, the processor loops back through block 90 and continually monitors for the SOP signal. Once received, the process transfers to block 92 where the delay counts are generated and to block 94 which determines if the SOL signal has been received. While no SOL signal is being received, the processor loops back through blocks 92 and 94 to continually generate delay counts. Thus, the longer the difference between the receipt of the SOP and SOL signals, the larger the number of delay counts. Once the SOL signal is received, the process is transferred to block 96 which performs the scanning of the lines on the web from the data stored in the printer's memory, or from some device external to the printer.

Block 98 determines when the paper is ready to be fed into the transfer section of the printer. This determination depends upon the normal position of the web in the vicinity of the transfer position and does not take into consideration the extra delay caused by the differences between the SOL and the SOP signals. The added delay caused by the different times the SOL and SOP signals are received is the function of block 100 which delays process flow to the feed paper signal, as shown by block 102, by an amount of time equal to the time delay between the receipt of the SOP and SOL signals.

Figure 7:
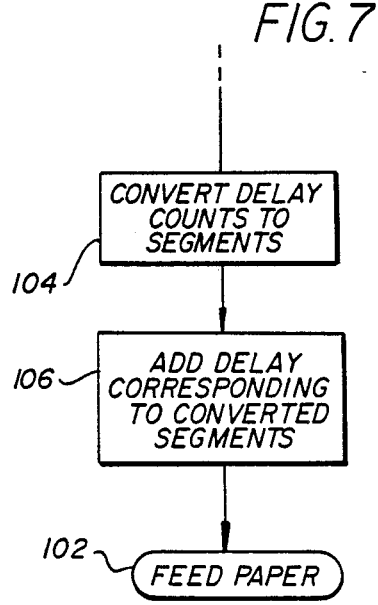
FIG. 7 is a partial flow chart illustrating changes in FIG. 6 for segmented operation.

FIG. 7 is a partial block diagram of changes needed to the block diagram shown in FIG. 6 to provide segmented operation of the system. According to FIG. 7, blocks 104 and 106 would be substituted for block 100 in FIG. 6. Consequently, the delay counts are converted to larger quantity segments, and the segments are used to add a fixed delay to the feed paper command. In the case of either segmented or nonsegmented operation under microprocessor control, the feed paper signal is delayed by an amount of time from the regular paper feed command corresponding and dependent upon the position of the laser beam when the web was ready to be scanned with image data.

The apparatus and method disclosed herein permits the construction of laser printers which have extremely high registration accuracy between the original document and the reproduced document, and between documents reproduced with different color separations. The registration accuracy is achieved through a novel concept which is convenient to implement and economical to provide in the laser printer apparatus. It is emphasized that numerous changes may be made in the above-described apparatus and method without departing from the teachings of the invention. It is intended that all of the matter contained in the foregoing description, or shown in the accompanying drawings, shall be interpreted as illustrative rather than limiting.

I claim as my invention:

1. A scanning printer for making hard copy documents on a sheet material, said printer comprising:
   a movable photosensitive surface;
   means for detecting the position of the movable surface;
   means for scanning a modulated light beam across said surface while the surface is moving;
   means for detecting when the beam is substantially at the beginning of a scan line;
   means for feeding a sheet of the document material into an area where a developed image on the surface, previously defined by successive scans of the light beam across the surface, is transferred to the sheet; and
   means for delaying the feeding of the sheet from the sheet feeding means, with the delay time being dependent upon a difference in time between the position detection of the photosensitive surface and the detection of the beam, and with the dependency being a function of the position of the beam along a scan line when the movable surface position detecting means signals the start of scanning for defining the image.

2. The scanning printer of claim 1 wherein the delay time is equal to the time lapse required for the beam to begin scanning a new line after the movable surface position detecting means signals the start of scanning.

3. The scanning printer of claim 1 wherein the position of the beam along the scan line is effectively segmented to reduce the number of possible delay time quantities, with the delay anywhere within the same segment being equal.

4. The scanning printer of claim 1 wherein the photosensitive surface is a continuous web of photosensitive material positioned around a plurality of rollers.

5. The scanning printer of claim 1 wherein the photosensitive surface has perforations along an edge of the surface, and wherein the means for detecting the position of the surface includes a light source and detector aligned to provide an electrical signal to associated circuitry when a perforation moves between the source and the detector.

6. The scanning printer of claim 1 wherein the means for detecting when the beam is substantially at the beginning of a scan line includes a light responsive detector device located in the line of scanning of the beam and positioned adjacent to an edge of the photosensitive surface.

7. The scanning printer of claim 1 wherein the delaying means comprises:
   means for comparing the signals from said two detecting means and providing an output count representative of the time difference between the two detections;
   means for converting the output count into a time delay; and
   means for delaying activation of a signal to feed the sheet by said time delay.

8. A scanning printer for making hard copy documents on a sheet material, said printer comprising:
   a movable photosensitive surface;
   means for scanning a modulated light beam across said surface while the surface is moving to form lines of a latent image on the surface;
   means for feeding a sheet of the document material into an area where a developed image on the surface is transferred to the sheet;
   means for issuing a start of page (SOP) signal dependent upon the position of the surface;
   means for issuing a start of line (SOL) signal dependent upon the position of the light beam; and
   means for delaying the synchronized feeding of the sheet with the photosensitive surface for a time period dependent upon the timing of the SOP and SOL signals, said dependency relating to the position of the beam along a scan line when the SOP signal is issued.

9. The scanning printer of claim 8 wherein the SOP signal is used to determine when the next SOL signal is to be used to start scanning a new document page onto the photosensitive surface.

10. The scanning printer of claim 8 wherein the SOL signal is activated when the beam starts to scan substantially a new line.

11. The scanning printer of claim 8 wherein the delaying means comprises:
    means for comparing the SOP and SOL signals and providing an output count representative of the time difference between the two signals;
    means for converting the output count into a time delay; and
    means for delaying activation of a signal to feed the sheet by the amount of said time delay.

12. The scanning printer of claim 8 wherein the period of delay is equal to the time lapse required for the beam to begin scanning a new line after the SOP signal is issued.

13. The scanning printer of claim 8 wherein the period of delay is equal to the time difference between when the SOP and SOL signals issue.

14. The scanning printer of claim 8 wherein the position of the beam along the scan line is effectively segmented to reduce the number of possible delay time quantities, with the delay anywhere within the same segment being equal.

15. A method of controlling the placement of a transferred image onto a sheet of document material in a scanning printer having a movable photosensitive surface, said method including the steps of:
 determining when the surface is in position to be scanned by a modulated light beam to define a latent image on the surface;
 measuring how much time it takes the beam to reach a start of line position after the surface is in the position to be scanned; and
 subsequently feeding a sheet along the surface for transfer of a developed image to the sheet, said feeding being additionally delayed by said measured time.

* * * * *